May 19, 1970 K. STAUGAARD 3,512,623
VERTICAL FORMAT CONTROL FOR HIGH-SPEED PRINTERS
Filed Oct. 20, 1965

INVENTOR
KENNETH STAUGAARD

BY

FRANK W. BARNES
AGENT

United States Patent Office 3,512,623
Patented May 19, 1970

3,512,623
VERTICAL FORMAT CONTROL FOR HIGH-SPEED PRINTERS

Kenneth Staugaard, Rochester, Mich., assignor to Burroughs Corporation, Detroit, Mich., a corporation of Michigan Filed Oct. 20, 1965, Ser. No. 498,807
Int. Cl. B41j 5/36
U.S. Cl. 197—20 3 Claims

ABSTRACT OF THE DISCLOSURE

The invention relates to a format control system having a static card reader for receiving a prepunched format card with means for sequentially interrogating, column by column, the information stored on the card. This information is compared in a coincidence detector with inputs from a data procesor. Upon coincidence being detected, an output signal is generated which is gatably applied to paper motion brake logic to stop a print receiving medium for printing. Means are also provided for stepping the interrogation means to the next column of the format card.

This invention relates to format control for high-speed printers, and more specifically to format control of vertical line spacing in high-speed printers by a statically read punched card.

In modern high-speed printers and accounting machines it is necessary to have some form of format control, that is, control of the spacing between lines as well as the spacing between words on figures on each line so that the printed matter is compatible with a business form being used. Originally, format control was included in the information record by the use of additional rows of punched holes in the card or tape. This method not only used valuable space on individual cards for instructions of a repetitive nature, but also was expensive, in that it required the repetitive instructions to be punched on individual cards.

In further development, the high-speed feeding of a continuous record strip, divided into forms, has been controlled by mechanisms wherein the places for different headings, body sections, predetermined total lines, overflow lines etc., have been preselected by the use of changeable program boards, endless perforated tapes having transmission boxes and solar cells reading assemblies, or mechanical means such as levers and contacts. It will be appreciated that many of these methods not only required a skilled operator to change the control means or program when it was desired to change the format itself, but also, the additional hardware increased both the maintenance and the initial cost of the machine.

Additionally, when the above-mentioned control means, especially the endless perforated tapes, have been utilized in combination with high-speed printers, there have been problems using synchronizing mechanisms, with inherent inertia, which have resulted in a drag on the machine, and more importantly, in additional expense in manufacture and maintenance.

It is, therefore, an object of this invention to improve existing format controls in high-speed printer operations.

It is an additional object of this invention to provide a relatively simple, insertialess format control for high-speed printing operations.

It is an additional object of this invention to provied a simple format control for high-speed printers wherein the format may be easily changed by the operator.

In carrying out the above objects, applicant's format control of vertical line spacing in a high-speed printer comprises a static card reader for receiving a prepunched format card, means for sequentially interrogating, column by column, the information stored on the prepunched format card, a coincident detector having one set of inputs from a computer or data processor, and another from the static card reader, gating means having one input from the output of said coincidence detector and a second input from a source of reference pulses. There is an output from the gating means to paper motion brake logic upon coincidence of signals from the static card reader and the computer. Additionally, means are provided for stepping the interrogation means to the next column of the format card, the stepping means being delayed one bit with respect to the next line or portion to be printed.

Further objects and advantages will become apparent or be specifically pointed out in the following specification when taken with the accompanying drawing in which.

Figure 1:
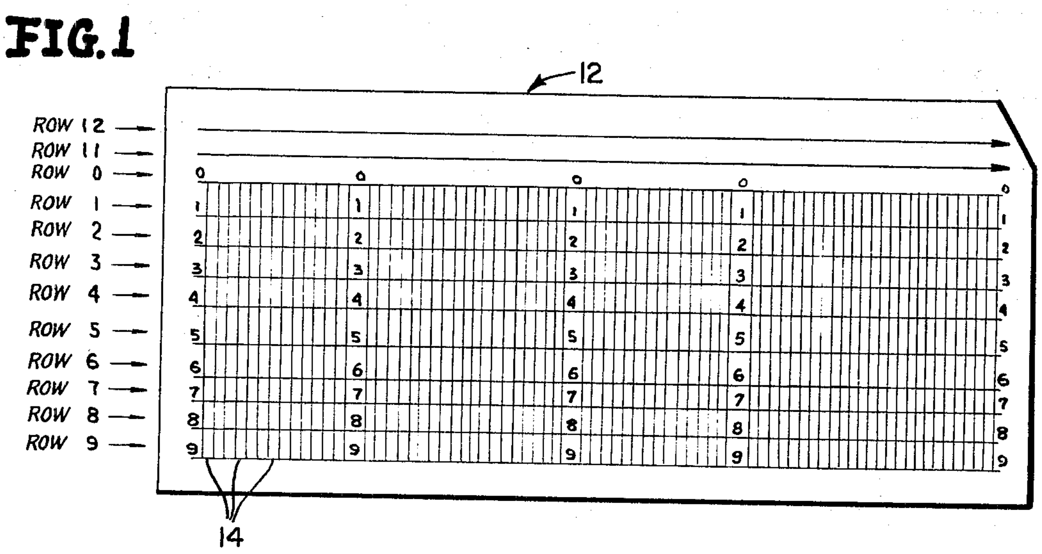
FIG. 1 is a replica of a standard punch card.

In FIG. 1 there is shown a standard punch card 12. The punch positions on the card 12 are defined by twelve horizontal rows designated from top down as the twelve-row, eleven-row, and zero through nine rows. The card 12 is divided into eighty vertical columns 14. Numbers are stored on the punch card 12 by punching each digit of the number in the corresponding row of the card 12. When utilizing a punch card 12 with the present invention every other column of the card 12 is utilized. This gives 480 available hole positions on the card 12.

Figure 2:
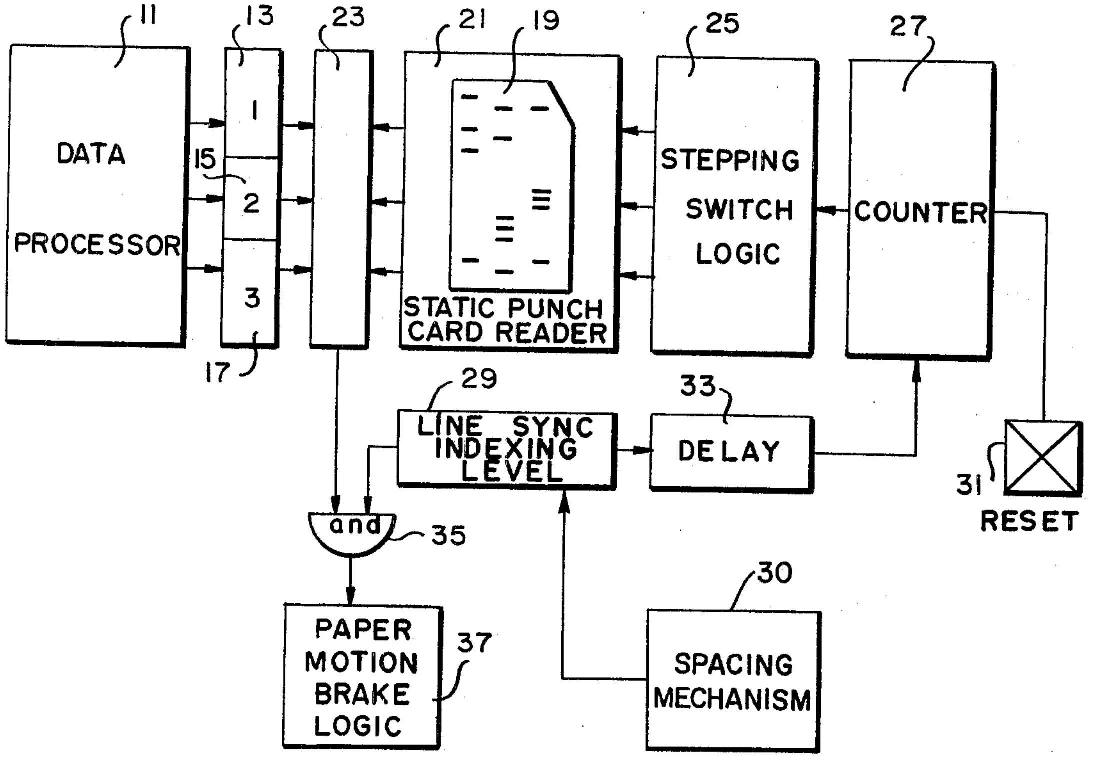
FIG. 2 is a schematic representation of applicant's format control.

Referring now to FIG. 2, a three level input from a computer or data processor 11 controls three bistable devices such as flip-flops 13, 15, and 17 to indicate the next format position for which the computer 11 has information for printing. In prior art systems the three level input is used to select one of eight channels of a continuous perforated format tape which is synchronized with the motion of the paper. After a channel on the tape is selected, the tape and the paper continue to advance until a hole is encountered in the selected channel. The paper then stops and the printing occurs. Therefore, the three level input from the data processor is the same input which was previously used to select a channel in a continuous perforated format tape.

The static card reader 21 is simply a 480 contact pin reader, known in the art, that has the capability of interrogating any one or all of the 480 available hole positions in an immobile punch card 19 which is shown schematically in the static punch card reader 21. The punch card 19 is identical to the standard punch card 12 except that information has been encoded in the card 19. As is well known in the art, a pair of contact pins (not shown) is provided in the reader 21 for each of the 480 hole positions in the card 19. If a hole is punched in the card 19 the contacts for that hole form a circuit to a source of reference potential connected to one of the contacts, thereby indicating the presence of a punch in an available hole position.

The spaces and information on a punch card are utilized by those skilled in the art in various combinations as required by current purposes. For example, a three-level signal requires that 3 rows of spaces be punched as a group, a four-level signal that 4 rows of spaces be punched as a group, etc. For purposes of the illustrated apparatus a three-level signal is sufficient.

The reader 21, under control of stepping switch logic 25 can be considered to divide the card 19 into Sections for interrogation with Section I comprising Row 12, Row 11 and Row 0; Section II comprising Row 1, Row 2 and Row 3; Section III comprising Row 4, Row 5 and Row 6; and Section IV comprising Row 7, Row 8 and Row 9. The reader 21 controlled by logic 25 interrogates a single column and three rows at a time of the card 19, beginning in Section I column 1 and proceeding one column at a time to Section I column 40. The reader 21 then interrogates Section II column 1 and moves rightward to column 40. The other Sections are interrogated in a similar sequence. Thus, the contact pairs in the reader 21 which sense holes in the card 19 are interrogated in groups of three by the stepping switch logic 25, which activates a separate three-level position in the reader 21 for each count contained in a 132 position counter 27. Thus, as the counter 27 is indexed from one count to another count, the stepping switch logic 25 steps the reader 21 from the selection of one three-level position to another three-level position.

Referring again to FIG. 2, stepping switch logic 25, shown only in block form, is in effect 132 position gates or 132 diode logic gates (a simple form of which is shown on p. 111 of Diode Circuits Handbook, Rufus P. Turner, Bobbs-Merrill Co., Inc., 1963), that cause a three level read out pulse to read a three level position on the punch card 19 in the static punch card reader 21. If the counter 27 contains the value "1" then the logic 25 selects the three-level position 1 (Section I, column 1) in the reader 21 and if the counter 27 contains the value "2" then the logic 25 selects the three-level position 2 (Section I, column 2) in the reader 21. The values "3" through "132," in the counter 27 similarly cause the logic 25 to select the three-level positions 3 through 132, respectively, in the reader 21. Each of the 132 positions in the counter sequentially represents a line on the form being printed under the control of the format. Thus, the three-level position number in the reader 21 is identical to the value in the counter 27.

The 132 position counter 27 is a simple transistorized binary counter of any of the well-known configurations which steps sequentially from one to 132 as a signal is received from the line sync indexing level 29. A simple example of a counter-matrix combination may be found in FIG. 18.3 of Digtial Computer Principles, McGraw-Hill, 1962. The position counter 27 also is resettable to position 1 by an external manual operator switch 31. Depressing manual operator switch 31 causes the setting of the entire position counter 27 to all zeros. Manual operator switch 31 is often referred to as a "skip to heading" position switch. A one bit delay 33 means interconnects the line sync indexing level 29 and the position counter 27.

Upon coincidence being sensed in detector 23 of outputs from the flip-flops 13, 15, and 17, with outputs from static card reader 21, a signal is routed from detector 23 to AND gate 35. The coincidence detector 23 may be of the type which gives an output upon exact correspondence of two binary signals. The detector 23 can comprise conventional logic gates to implement the logic expression $$(DP1 \cdot R1 + \overline{DP1} \cdot \overline{R1}) \cdot (DP2 \cdot R2 + \overline{DP2} \cdot \overline{R2}) \cdot (DP3 \cdot R3 + \overline{DP3} \cdot \overline{R3})$$

where DP1, DP2 and DP3 represent the 1, 2 and 3 levels, respectively, of the data processor 11, and where R1, R2 and R3 represent the corresponding 1, 2 and 3 levels, respectively, of the reader 21. Substantially simultaneously with the arrival of this signal at AND gate 35, a pulse from the line sync indexing level 29 arrives as a second input to said gate 35, causing an output to paper motion brake logic 37, which stops the advance of the form through the machine so that printing can take place. The pulse from the line sync indexing level 29, after being delayed one bit, is fed into the position counter 27, which causes the stepping switch logic 25 to step one position and cause the static punch card reader 21 to interrogate the card 19 in the next three-level position.

The normal sequence of events in a single cycle is originated by the operator's placing the format punched card 19 in the static punch card reader 21 and depressing the "skip to heading" or manual operator switch 31. This steps the position counter 27 to a preselected position and holds it there for the next instruction or stepping command. At this point the format controller is ready to begin operation. The first input to the printer from the data processor 11 is, for example, a binary representation of 101. This input is applied to flip-flops 13, 15, and 17, respectively, and sets them according to the given code.

The coincidence detector 23 immediately checks for coincidence with the card output which is at its initial three-level position. If the card output is 101, then that line, i.e., the first three-level position, is the line to which the printer spacing mechanism will skip, in accordance with the command which is called for by the coded position 101. The line sync indexing level 29 is a source of evenly spaced clock pulses occurring at intervals coinciding with the alignment of a vertical line space for printing in the spacing mechanism 30. The line sync indexing level 29 is directly coupled to the spacing mechanism 30 and in combination with the coincidence pulse from detector 23 is applied through AND gate 35 to the paper motion brake logic 37 to stop the form in the printer. At the same time the pulse from line sync indexing level 29 is applied through delay means 33, and after one bit delay steps the position counter 27 to the next position. The printer has now completed the command, and the position counter 27 steps the stepping switch logic 25 to interrogate the next three-level position on punch card 19 in the static punch card reader 21. This sequence is repeated throughout the entire card 19 until it has returned to its initial or starting three-level position.

If the first three level positions of the card does not contain a coded 101 there is no output from coincidence detector 23 and the paper continues to move. The counter 27 is indexed by line sync indexing level 29 causing successive three level positions of punch card 19 to be read by reader 21 until a position is reached where the binary representation 101 is coded. The coincidence detector 23 then activates the paper motion logic brake 37 and the paper is stopped. Therefore, if in this case the binary representation 101 is coded in position 58 of punch card 19 the paper will stop on line 58.

One of the advantages of applicant's invention is that the punch card 19 may be created in the computer system of which the printer is a part, if there is a card punch in the system. If not, the punch card 19 would be created by a separate key punch device. The illustrated punch card 19 utilizes every other horizontal punched hole to allow sufficient space between punched holes for the card reader pins. Each section is made up of three rows of holes such that the input information need not be decoded within the printer, thus eliminating decoder logic.

The method suggested for reading the card 19 (the card code will be three level binary from zero to eight) is based on a matrix reader. Three of the rows of the 12 vertical row card 19 will be selected by the 132 position gates of the stepping switch logic 25. Section I, or rows 12, 11, and 0, on the top of the card 19 will be selected when the 132 position counter 27 is between 1 and 40; Section II, or rows 1, 2, and 3, of the punched card 19 will be selected if the counter 27 is between positions 41 and 80; etc.

For example, if the counter 27 is at a value of 58 (corresponding to the 58th printed line on the high speed printer), Section II of the card reader 21 will be selected (rows 1, 2, and 3 of th ecard 19) and column 18 of the 40 column card 19 will be also selected and coincidentally "read." If a value is read "from the holes" such as punched holes in rows 1 and 2 with a blank (no hole) in row 3 of the 18th column (Section II of the card 19), this signal is put into the coincidence detector 23 to compare it with the input signal (three level also) from the computer or data processor 11.

It will be obvious to those skilled in the art that applicant's system utilizing a static card reader 21 and counter logic for format control eliminates the tape gear transmission box and solar cell assemblies required with endless perforated tape, complex plug boards, and mechanical cams and switches previously known in the art. In addition, it would eliminate all movement of mechanisms during the format interrogation sequence, since the card reader is mechanically static.

What is claimed is:

1. A format control system for vertical line spacing in a high-speed printer associated with a data processor comprising:

means for storing a multi-level signal from said data processor, said multi-level signal containing format information;

means for statically reading information in a prepunched master format card statically affixable therein, said information being stored in a plurality of multi-level information positions disposed in rows and columns of said card, the number of information levels in each position corresponding to the number of levels in said multi-level signal;

a binary counter for producing a sequence of binary numbers, said counter advancing upon input of an indexing signal;

stepping switch logic means for receiving a signal from said counter and causing said reading means to step from one of the information positions to another of the information positions;

means for producing a line spacing synchronizing signal;

means for utilizing said synchronizing signal for indexing said counter;

a coincidence detector operatively associated with said storing means and said reading means and having an output upon coincidence of the multi-level signals in said storing means and said reading means;

gating means for producing an output upon presence of said coincidence output and said synchronizing signal; and paper motion brake logic activated by said gating output, for stopping paper motion in said printer.

2. The system of claim 1 wherein said means for utilizing includes means for delaying said synchronizing signal and presenting said delayed synchronizing signal to said counter.

3. A vertical line spacing control system for a high-speed printer associated with a data processor and utilizing a static format card having a plurality of multi-level format positions arranged in rows and columns thereof, each of said positions representing a discrete vertical line in said printer, comprising:

means for reading data in a selected position of said format card and providing a multi-level format signal;

electronic logic means for sequentially stepping said reading means from one position to another position on said format card in response to a binary input;

a binary counter for controlling the sequential stepping of said logic means;

means for producing a synchronizing reference of line spacing in said printer, said synchronizing reference being coupled to said counter to advance the count therein;

a coincidence detector for receiving a multi-level data processor signal and said multi-level format signal, and for providing an output upon correspondence of the two signals; and means responsive to said coincidence detector output and said synchronizing reference for activating motion brake logic to stop vertical line motion in said printer.

References Cited

UNITED STATES PATENTS

| | | | |
|---|---|---|---|
| 2,678,713 | 5/1954 | Higonnet et al. | 197—84 |
| 2,769,518 | 11/1956 | Faulkner et al. | 197—20 |
| 2,831,561 | 4/1958 | Speh | 197—133 |
| 3,019,881 | 2/1962 | Cetran et al. | 197—133 X |
| 3,063,537 | 11/1962 | Allen | 197—19 |
| 3,072,238 | 1/1963 | Chan | 197—20 X |
| 3,094,261 | 6/1963 | Thompson | 197—133 X |
| 3,120,301 | 2/1964 | Lorch | 197—20 |
| 3,358,804 | 12/1967 | Feldman | 197—20 |

ERNEST T. WRIGHT, Jr., Primary Examiner

U.S. Cl. X.R.

197—133

PO-1050
(5/69)

UNITED STATES PATENT OFFICE
CERTIFICATE OF CORRECTION

Patent No. 3,512,623 Dated May 19, 1970

Inventor(s) Kenneth Staugaard

It is certified that error appears in the above-identified patent and that said Letters Patent are hereby corrected as shown below:

Column 1, line 19, "procesor" should be --processor--; Column 1, line 68, "provied" should be --provide--; Column 2, line 47, after "tape." insert the following sentence --The three levels from flip-flops 13, 15, and 17 are transferred to a coincidence detector 23 to check for coincidence with a signal from the static punch card reader 21.--; Column 4, line 68 "th ecard" should be -- the card--.

SIGNED AND
SEALED

OCT 27 1970

(SEAL)
Attest:

Edward M. Fletcher, Jr.
Attesting Officer

WILLIAM E. SCHUYLER, JR.
Commissioner of Patents